(12) United States Patent
Vogel et al.

(10) Patent No.: US 9,626,262 B1
(45) Date of Patent: Apr. 18, 2017

(54) PRIMARY ROLE REPORTING SERVICE FOR RESOURCE GROUPS

(71) Applicant: Amazon Technologies, Inc., Reno, NV (US)

(72) Inventors: Nicholas Ryman Vogel, Seattle, WA (US); Colm MacCarthaigh, Seattle, WA (US); Grant Alexander MacDonald McAlister, Seattle, WA (US); Laurion Darrell Burchall, Seattle, WA (US); Jorgen Lawrence Johnson, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 208 days.

(21) Appl. No.: 14/100,414

(22) Filed: Dec. 9, 2013

(51) Int. Cl.
  *G06F 11/20* (2006.01)
  *G06F 11/30* (2006.01)
  *H04L 12/26* (2006.01)

(52) U.S. Cl.
  CPC ...... *G06F 11/2033* (2013.01); *G06F 11/2005* (2013.01); *G06F 11/2028* (2013.01); *G06F 11/3006* (2013.01); *H04L 43/0805* (2013.01)

(58) Field of Classification Search
  None
  See application file for complete search history.

(56) References Cited

U.S. PATENT DOCUMENTS

| | | | |
|---|---|---|---|
| 5,566,299 A * | 10/1996 | Billings | G06F 11/2007 714/4.1 |
| 7,657,629 B1 * | 2/2010 | Kommula | 709/226 |
| 7,808,893 B1 * | 10/2010 | Liu et al. | 370/225 |
| 7,840,678 B2 * | 11/2010 | Joshi | 709/226 |
| 8,074,107 B2 * | 12/2011 | Sivasubramanian et al. | 714/6.3 |
| 2003/0220990 A1 * | 11/2003 | Narayanan | H04L 67/10 709/220 |
| 2004/0030801 A1 * | 2/2004 | Moran | H04L 69/329 709/244 |
| 2004/0151111 A1 * | 8/2004 | Yarroll et al. | 370/216 |
| 2010/0121932 A1 * | 5/2010 | Joshi et al. | 709/207 |
| 2011/0289417 A1 * | 11/2011 | Schaefer | G06F 11/1458 715/735 |

(Continued)

OTHER PUBLICATIONS

Amazon Web Services, Amazon Relational Database Service; pp. 1-11, Oct. 10, 2013.

(Continued)

*Primary Examiner* — Albert Decady
*Assistant Examiner* — Paul Contino
(74) *Attorney, Agent, or Firm* — Robert C. Kowert; Meyertons, Hood, Kivlin, Kowert & Goetzel, P.C

(57) ABSTRACT

Methods and apparatus for a primary role reporting service for resource groups are disclosed. A reporting intermediary assigned to a resource group of a network-accessible service receives role information indicating the identity of a primary member of the group from a state manager of the network-accessible service. The intermediary receives a health status query pertaining to the resource group from a health checking subsystem used by a network address discovery service, and provides a health status response based on the role information. The response provided by the reporting intermediary is used by the network address discovery service to provide a network address in response to a lookup query for the resource group.

21 Claims, 9 Drawing Sheets

(56) References Cited

U.S. PATENT DOCUMENTS

2012/0159235 A1* 6/2012 Suganthi ............ G06F 11/2028
714/4.11
2013/0318221 A1* 11/2013 Anaya .................... G06F 9/505
709/223

OTHER PUBLICATIONS

Amazon Web Services, Amazon Route 53; pp. 1-6, Oct. 10, 2013.
AWSdocumentation, Route 53 Health Checks and DNS Failover; 1 page, Oct. 10, 2013.
Amazon Route 53 Developer Guide, API Version Dec. 12, 2012; pp. 1-151.

* cited by examiner

PRIMARY ROLE REPORTING SERVICE FOR RESOURCE GROUPS

BACKGROUND

Several leading technology organizations are investing in building technologies that sell "software-as-a-service". Such services provide access to shared storage (e.g., database systems) and/or computing resources to clients or subscribers. Within multi-tier e-commerce systems, combinations of different types of resources may be allocated to subscribers and/or their applications, such as whole physical or virtual machines, CPUs, memory, network bandwidth, or I/O capacity.

One of the many benefits of using the software-as-a-service approach is that providing the desired levels of availability, data durability and scalability becomes the responsibility of the service operator. Clients of the services may simply decide what levels of availability, durability and performance they wish to pay for, and leave the implementation details to the services. The service operators may consequently establish numerous data centers, often geographically distributed across different cities, states, or even countries, and populate the data centers with computing, networking, and storage infrastructure based on expectations of client usage levels for the various services. The specific resources used for a given client may be selected from several different data centers, for example, to achieve desired levels of fault tolerance and data durability. In the case of a database service, for instance, multiple replicas or instances of a given database instance may be implemented at different locations, with one of the replicas designated as the "primary" replica responsible for handling work requests at any given point in time, while the other replicas are designated as "non-primary" replicas that can each take over the primary role in the event of a failure at, or a loss of connectivity to, the primary.

In at least some scenarios in which highly available services are implemented in such a replicated manner and are configured to be accessed from a variety of network locations (such as various locations from the public Internet), a network address discovery service (such as a service based on the Domain Name System or DNS technology) may be used by clients of the service to direct work requests to the appropriate replica. When state changes occur at the service, e.g., when a primary replica fails or becomes inaccessible and a new primary is selected, the address discovery service's database may have to be updated regarding the state change. Unfortunately, in many cases some of the mechanisms available to update the address discovery service databases may themselves be slow and/or lack the desired levels of availability or reliability.

Figure 1:
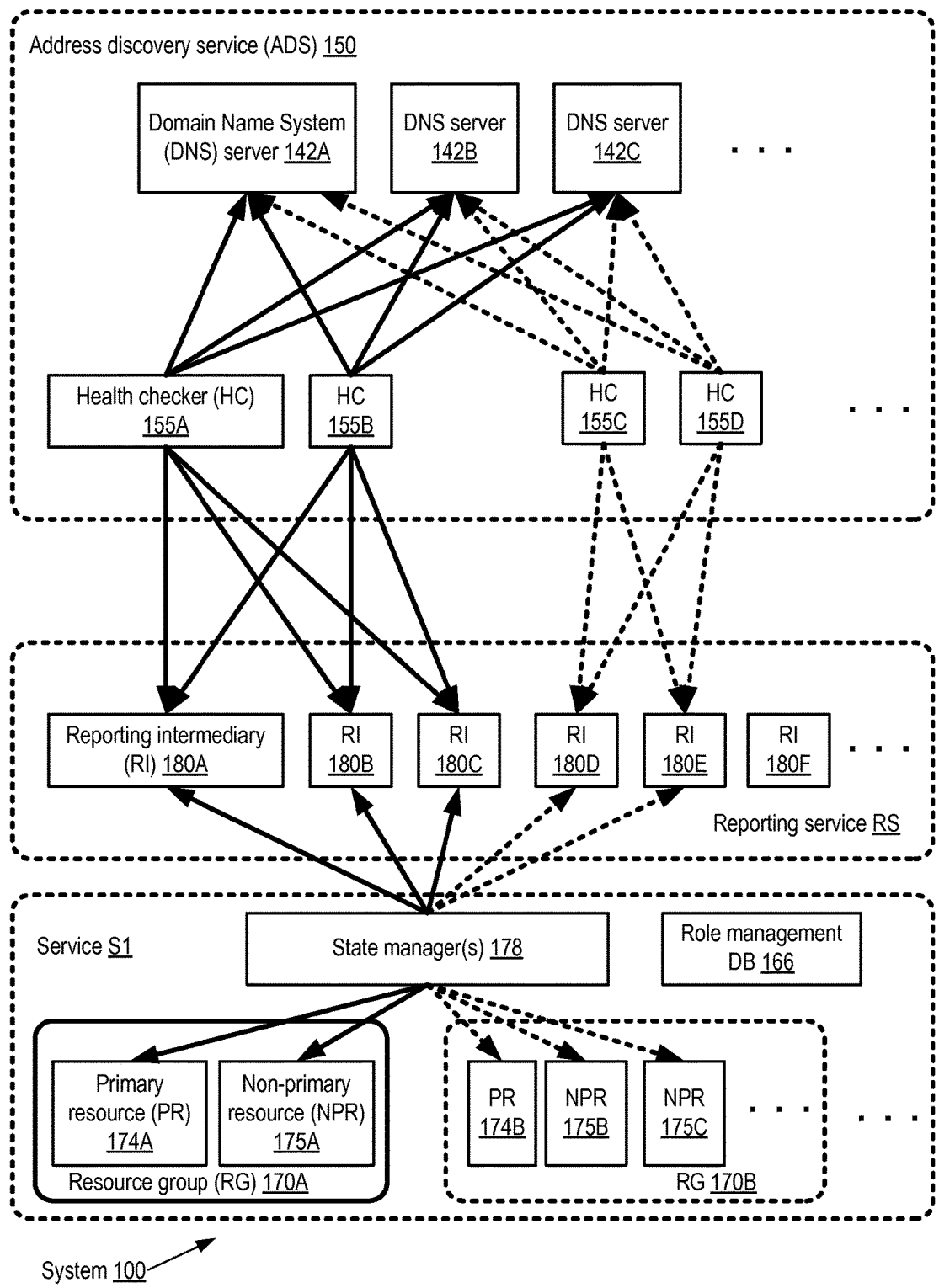
FIG. 1 illustrates an example of a system in which a plurality of reporting intermediaries are configured to provide resource role information via a health checking mechanism to a network address discovery service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for a primary role reporting service for resource groups are described. According to some embodiments, the resources of a network-accessible service such as a database service implemented at a provider network may be organized into resource groups for various reasons, such as high availability requirements and/or performance requirements. Each resource group may comprise a plurality of resources (such as replicas of a database instance) to which different roles may be granted—e.g., at any given point in time, one member of a resource group may be designated as a "primary" resource for handling at least some categories of work requests, while other members of the resource group may be designated as "non-primary" resources for the categories of work requests. A resource group may be made accessible to external clients (e.g., clients located inside or outside the provider network) via network addresses provided by a network address discovery service (ADS), such as a DNS-based service in some embodiments. Generally speaking, a name or identifier may be assigned to the resource group, and the ADS may be responsible for responding to lookup queries that specify the name by providing the network address that can be used to access the primary member.

In some embodiments, the ADS may be configurable to utilize a health-checking mechanism, whereby for a given set of resources performing a similar function, the ADS may check on the health status of the members of the set, and respond to address lookup queries by providing the address of a member whose health is deemed satisfactory. According to various embodiments, the primary role reporting service may inform the ADS, via such a health-checking mechanism, regarding the roles of the resource group members in an efficient and highly available manner, as described below in further detail. In some embodiments, the reporting service and the health checking mechanism may be implemented using respective sets of computing devices, while in other embodiments a given host or computing device may implement both the health-checking functionality and the reporting functionality. Using the reporting service, changes in the assignment of primary status at various resource groups may, for example, be propagated rapidly to in-memory data structures at various ADS servers, without having to wait for updates to be applied to persistent ADS control-plane databases. Furthermore, by selecting the appropriate numbers and placements of the reporting intermediaries established for different resource groups, the information flow regarding resource group roles may be sustained even in the event of various types of large-scale failures, as also described below.

Networks set up by an entity such as a company or a public sector organization to provide one or more network-accessible services (such as various types of cloud-based database, computing or storage services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network. In at least some embodiments, a virtualized computing service offering various types of compute instances may be implemented within the provider network, and such compute instances may be allocated to clients. Other services of the provider network may be accessed from such compute instances as well as from external locations. According to some embodiments, such compute instances may also be used to implement the types of reporting intermediaries and health checkers described below.

A database service may be offered by a provider network in some embodiments, enabling clients to use the provider network's compute and storage capabilities to implement database applications over network connections, e.g., using one or more programmatic interfaces such as a web-services interface. For example, using such a programmatic interface, a client of the database service may issue a respective request to create a database instance, to create a table within an instance, to insert data into a table, to read data from a table, and so on. The database service may implement any of various types of database technologies and models in different embodiments, such as a relational database, an object-oriented database, a key-value based non-relational (e.g., a "NoSQL") database, a document-oriented database, and so on. In much of the subsequent description, the reporting service is described largely in the context of a network-accessible database service in which different replicas of database instances are granted different roles, and the reporting service conveys replica role information using a health-checking mechanism. It is noted that the reporting techniques described herein are not limited to being used in a database service context, and that in various embodiments, such techniques may be applied to any of a variety of other services in which different resources are granted modifiable roles or capabilities.

According to one embodiment, the database service may support a high level of data durability and/or availability. In one example implementation, to achieve the desired high durability and/or availability, a resource group comprising N replicas R1, R2, . . . RN of a database instance may be stored in respective availability containers of the provider network (where N may be selectable by the database service, e.g., in response to clients' durability or availability requirements). A given availability container may comprise a portion or all of one or more data centers, and may be engineered in such a way as to prevent various types of failures within a given availability container from impacting operations at other availability containers. Thus, for example, a given availability container AC1 may comprise a set of hardware, software and infrastructure components (such as power supplies, power distribution units, cooling/heating equipment, networking equipment and the like) that has a failure profile (e.g., a probability distribution over time of various types of faults or errors) that is not expected to be correlated with the failure profile of a different availability container AC2. Each availability container may itself be designed to have very low failure rates, along with the isolation characteristics that prevent cascading faults across multiple availability containers. The implementation of numerous availability containers capable of containing failures within their respective boundaries may enable highly reliable and durable services to be provided using the provider network. Thus, in the case where N replicas of a database instance are stored in respective availability containers, the instance would remain accessible even if N–1 availability containers happen to become unavailable at once, reducing the probability of a complete outage to very near zero. Availability containers may also be referred to as "availability zones" in some implementations. In at least some embodiments, the resources of a geographically distributed provider network may be organized into a hierarchy of geographical regions, with each region comprising some number of availability containers, and each availability container comprising part or all of one or more data centers.

In one embodiment, one of the replica instances of a resource group may be granted a "primary" role or "master" role, making that replica the target of various types of client work requests (e.g., writes or queries) directed at the resource group. Other members of the resource group may be designated as "non-primary" (or in some cases, given specific non-primary roles such as "secondary" or "tertiary", indicating for example the order in which they are to be selected to replace the current primary). The role of a given member may be changed in response to various events—e.g., in one embodiment, a primary role may be revoked from a member upon a detection of an error, failure, or overload condition by a state manager component of the service, and a different member may be designated as the primary. In some embodiments, different members of a resource group may be granted the primary role for different types of work requests—e.g., one member may be made primary for handling write requests, while another set of members may be made primaries with respect to read requests.

When a client wishes to issue a particular work request directed to a resource group, in at least some embodiments the target network address of a primary member of that resource group for that type of work request may be obtained by the client from an ADS server. Thus, when the primary role is revoked or granted to a different member of the resource group, information regarding the role change may have to be provided to the ADS. In some embodiments, one or more reporting intermediaries (RIs) (which may also be referred to as "reporting agents" or simply "reporters") may be assigned to the resource group of a network-accessible service to participate in the role change information transfer. A reporting intermediary may be implemented using any combination of hardware and/or software in different embodiments—e.g., in one embodiment, a reporting intermediary may comprise a process or thread of a program executed at a virtual or physical compute server of a computing service implemented in the provider network. The reporting intermediaries may be provided role information for various members of the resource group by a state manager component of the service being implemented at the resource group. In some implementations, the state manager may provide role information to reporting intermediaries only when state changes occur, while in other implementations, the most current role information may be provided to the RIs periodically, regardless of whether a role change has occurred or not.

In some embodiments, the reporting intermediaries may interact with a health checking mechanism, e.g., a general-purpose health monitoring mechanism accessible by the ADS (and in some implementations incorporated within the ADS) to transfer the resource group role information to the ADS. In general, such a health checking mechanism or subsystem may be responsible for determining, via various types of health status queries formatted according to selected protocols, whether a particular server or device is responsive or "up", and providing the results of such queries to the ADS servers responsible for responding to address lookup queries. The reporting intermediaries may be registered with the health checking subsystem to respond to health status queries pertaining to the resource group in at least one embodiment. For example, in one implementation, when a health status request (such as a HyperText Transfer Protocol (HTTP) GET request as described below) pertaining to the current primary member M1 is received, a reporting intermediary may respond that M1 is healthy, while if a health status request pertaining to a non-primary member M2 is received, the reporting intermediary may respond that M2 is unhealthy (even though the non-primary member may actually be functional, and even though no significant failures or errors may have been detected at the non-primary). Thus, in at least some embodiments, the health status response generated by a reporting intermediary may be derived from (and may serve as an indirect indicator of) the role information received from the state manager. The reporting intermediary may thereby be able to take advantage of a health checking infrastructure and protocol already configured for use by the ADS to indicate the identity of the primary, in effect overloading health status responses to serve as indicators of primary or non-primary roles. In turn, in such embodiments, the health status response may be utilized by the ADS to select a network address of the primary member to be included in a response to a lookup query requesting a network address of the resource group. If and when the primary role is revoked from its current grantee to a different member of the resource group, the health status for the two members (the original primary and the new primary) may be reversed in response to subsequent health status requests in such embodiments—e.g., the new primary may be reported as being healthy, and the old primary may be reported as being unhealthy.

A representation of the health status response, indicative of the primary role granted to one or more members of the resource group, may be stored in an in-memory database by one or more ADS servers in some embodiments. In some implementations, the ADS servers need not necessarily be aware that some resource of a group has been designated as the primary, as long as they are informed that a particular address (which happens to be the address of the primary) is the correct address to be provided in address lookup requests for the resource group. The in-memory database may, in some implementations, serve as a cache for a persistent control-plane database of the ADS. The notifications of primary status from the state manager to the reporting intermediaries, from the reporting intermediaries to the health checking subsystem, and from the health checking subsystem to the ADS servers responsible for responding to address lookup queries, may all be accomplished using frequent short, lightweight messages in at least some embodiments. In some implementations the logical equivalent of the health-checking functions described above may be performed by the same hardware and/or software modules that implement the reporting functions, e.g., reporting intermediaries that communicates directly with the ADS may be configured. Thus, in such implementations, the reporting intermediary may simply generate health status messages (with implicit primary role information) for the ADS in accordance with a health checking protocol being used by the ADS. Information identifying the primary member may thus be quickly provided to the ADS by the reporting intermediary, without the overhead of committing updates to persistent control-plane databases of the ADS. In at least some embodiments, primary role information may be passed on periodically to the ADS servers (e.g., once every few seconds) regardless of whether any role changes occurred in the interim, thus ensuring that the role information used to generate address query responses is kept up-to-date.

In at least some embodiments, in addition to using the information pathway for transmitting the primary role information involving the reporting service and the health checking subsystem, the state manager may also request updates to the persistent database of the ADS. In one such embodiment, respective weighted resource record sets (similar to typical DNS resource records in many ways, but with an additional weight field) may be stored in the persistent ADS database for each resource group. In one implementation of weighted resource records, if a resource group RG comprises N resources, its weighted resource record set may include at least N records. Each record may comprise the identifier or name of the resource group (e.g., the logical name or identifier of the database instance being implemented using the resource group), an IP (Internet Address) of the resource, and a weight value. When determining which IP address should be provided in response to a query for an address of the resource group, ADS servers may consider both the health status information and the weights assigned to the different members' resource records in some embodiments. For example, in one implementation, the primary member may typically be assigned a larger weight value than the non-primary members, and when examining the resource records, the IP address in the record with the highest weight that corresponds to a healthy resource may be used as the target address returned in response to a lookup query. When the primary changes, e.g., as a result of a failure or loss of connectivity, the state manager may submit a weight change request to the persistent ADS database (as well as changing the health status information provided to the reporting intermediaries and propagated to the ADS servers). Examples of the use of health status together with weights are provided below in conjunction with the description of FIG. 3a-FIG. 3d.

In at least some implementations, simple HTTP (or HTTPS (HTTP Secure)) messages and corresponding status codes may be used for health status queries and responses. For example, consider a resource group with two members M1 and M2. For each member, a respective HTTP URL (e.g., a first HTTP URL for M1 and a second HTTP URL for M2) may be registered with the health checking subsystem used by the ADS in one scenario. In such an example scenario, an HTTP GET request directed at any of the registered URLs may serve as a health status query for the corresponding resource group member. In some embodiments, the reporting intermediaries may comprise simple HTTP servers configured to respond to such HTTP requests. If the HTTP GET request succeeds (e.g., if the HTTP status code 200 is returned), the corresponding resource may be deemed to be healthy. If the HTTP GET results in a different status code such as an error code, e.g., if status code 404 is returned, the corresponding resource may be deemed unhealthy. Different sets of HTTP status codes may be interpreted as indicators of healthy and unhealthy states in various embodiments. In some embodiments, protocols other than HTTP or its derivatives may be used for health status checks.

Figure 4:
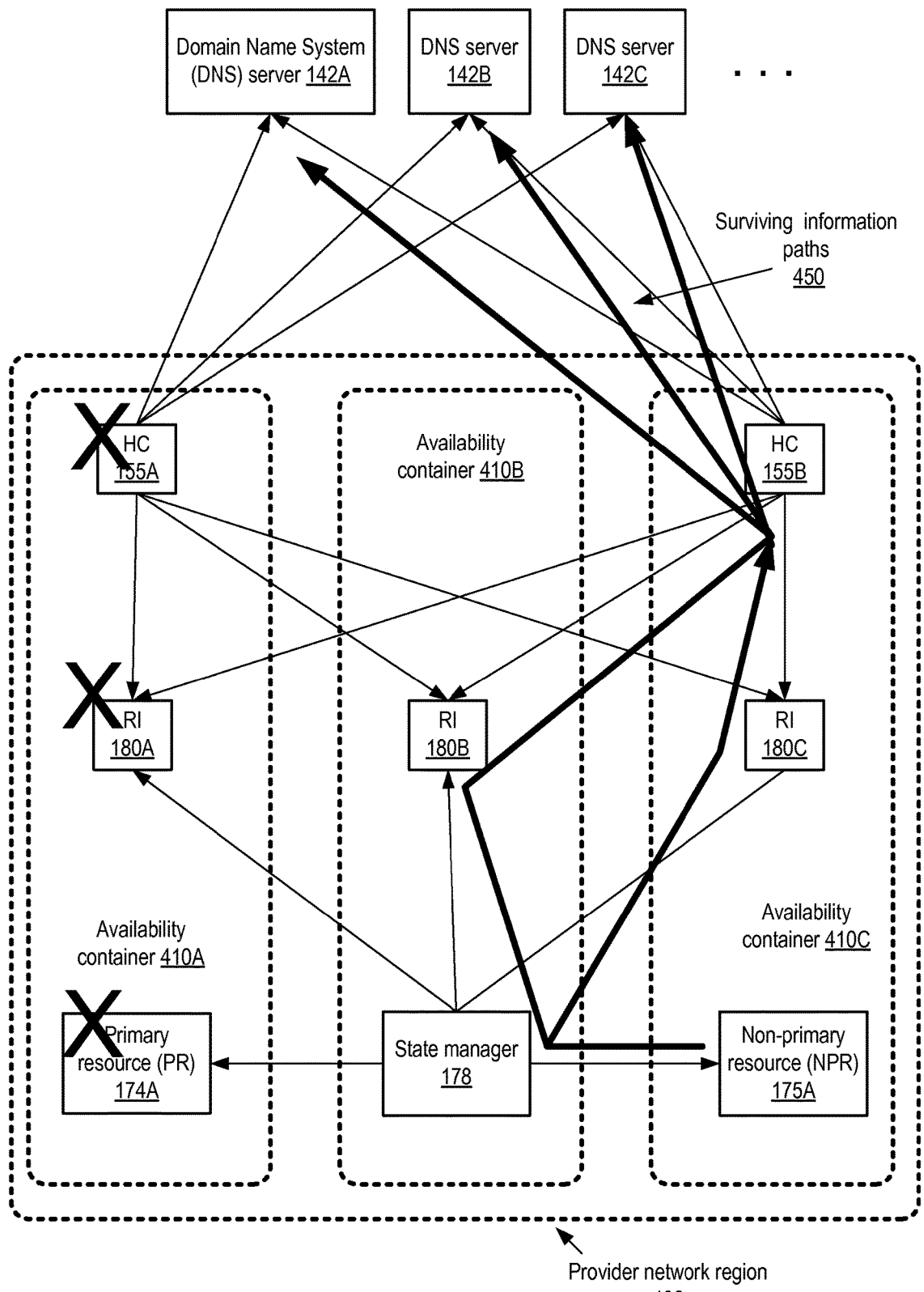
FIG. 4 illustrates an example of the use of reporting intermediaries in a provider network comprising a plurality of availability containers, according to at least some embodiments.

According to some embodiments, the health checking subsystem may comprise a plurality of nodes, which may for example be distributed across multiple locations (e.g., different data centers or different availability containers) of the provider network. In some cases, based for example on availability requirements indicated by clients of the service being implemented at the resource groups, more than one reporting intermediary and more than one health checker may be configured for a given resource group. Thus, in general, for a resource group with N members, M (where M is greater than or equal to one) reporting intermediaries may be set up, and each of the M intermediaries may in turn respond to health status queries from P health checking nodes (where P is greater than or equal to one). Different values of M and P may be selected for different resource groups in some embodiments, e.g., based on the resource group owners' budgets, the relative importance of the data sets of the resource group members as indicated by the owners, or the number of members in the resource groups. A given health checking node may obtain health status for a plurality of resource group members of one or more resource groups in some embodiments from a plurality of reporting intermediaries. Similarly, a given reporting intermediary may be configured to obtain role information of several different resource groups and respond to health status queries pertaining to the members of those resource groups from a plurality of health checking nodes. The physical placement of the resource group members, the reporting intermediaries, and the health checkers at different data centers may be determined in some embodiments so as to ensure that the resource group itself, and at least one primary reporting pathway to the ADS from the resource group, can survive various types of failures. In some embodiments, as illustrated in FIG. 4 and described below, the mechanisms used for role reporting may be designed to have enough redundancy to be resilient to at least some types of large-scale failures, such as a loss of connectivity to an entire availability container.

Example System Environment

FIG. 1 illustrates an example of a system 100 in which a plurality of reporting intermediaries are configured to provide resource role information via a health checking mechanism to a network address discovery service, according to at least some embodiments. Resources of a network-accessible service S1 implemented at a provider network are organized into resource groups (RGs) 170, such as RG 170A and 170B in the depicted embodiment. As shown, each RG 170 comprises a primary resource (PR) 174 (such as primary resource 174A of resource group 170A, and primary resource 174B of RG 170B) and one or more non-primary resources (NPRs) 175 (such as NPRs 175A of RG 170A and NPRs 175B and 175C of RG 170B). In different embodiments and for different types of network-accessible services, the capabilities and/or responsibilities of the primary member may differ from those of the non-primary members in various ways. For example, in one embodiment, the primary member may be responsible for handling all the work requests targeted at the RG, while the non-primary members may simply be passive or dormant, waiting to be designated as primary in the event of a failure. In other embodiments, some types of work requests (such as writes) may be directed at least initially at the primary, while other types of work requests may be handled by any member of the resource group. State manager(s) 178 may be responsible for monitoring and/or detecting events at the RG members which may lead to a change of roles in the depicted embodiment. A state manager 178 may comprise one or more hardware and/or software modules in some embodiments, and may itself be implemented in a distributed and highly-available manner. Information regarding the current roles granted to various members of the RGs may be stored in a role management database 166.

Clients of the service S1 may query a network address discovery service (ADS) 150 to obtain network addresses of the service's resources to which work request are to be directed. For example, in an embodiment in which S1 comprises a database service, and each RG 170 represents a logical database instance with multiple physical replicas as the member resources, a client may submit an address lookup query indicating the name or identifier of the logical database instance to a DNS server 142 (e.g., 142A, 142B or 142C) of ADS 150. The DNS server 142 may be responsible for providing the network address (e.g., an IP address reachable by the requesting client) of the primary replica of the corresponding RG. In the depicted embodiment, in addition to a plurality of DNS servers 142, the ADS 150 comprises a health checking subsystem with a plurality of health checker nodes 155, such as health checkers 155A, 155B, 155C and 155D. Each health checker 155 may be configurable to send health status queries to some number of registered responders, and to pass on the received health status responses to the DNS servers 142. Various services and applications implemented in the provider network that employ a high-availability architecture in which a given work request may in theory be responded to from a plurality of network addresses may register with the health checking subsystem to ensure that the appropriate network address is selected by the DNS servers. It is noted that address discovery and dissemination mechanisms other than DNS may be used in some embodiments by the address discovery service.

In system 100, a reporting service RS comprising a plurality of reporting intermediaries (RIs) 180 (e.g., RI 180A, 180B, 180C, 180D, 180E and 180F) may be established to receive role information from the state manager(s) 178 and to respond to health status queries from the health checkers 155 on the basis of the received role information. A plurality of RIs 180 may be configured for a given RG 170 in the depicted embodiment, and each RI may interact with a plurality of health checkers 155. For example, as indicated by the solid arrows, three RIs (180A, 180B and 180C) are configured for receiving role information regarding RG 170A and providing corresponding health status responses to queries from health checkers 155A and 155B. Similarly, as indicated by the dashed arrows, two RIs (180D and 180E) are configured for receiving role information regarding RG 170B and providing corresponding health status responses to queries from health checkers 155C and 155D. The health status queries submitted by the health checkers 155 may pertain to each of the members of a given resource group, while the health status responses may indicate that the primary members of the resource group is in a healthy state and that the non-primary members are in an unhealthy state. The indications that the primary members are healthy (and the non-primary members are not healthy) may lead the DNS servers 142 to provide the primary members' addresses in response to address lookup queries submitted by clients, and may thus result in client work requests being directed to the appropriate (primary) resources.

In at least some embodiments, the RIs 180 may comprise relatively simple software and/or hardware components that are configured to respond to HTTP or HTTPS requests. Health status queries regarding respective resources may comprise HTTP GET requests for corresponding HTTP URLs—e.g., each of the resources 174 and 175 may be represented by a respective URL for health status queries. In at least some embodiments, the state manger 178 may be responsible for pushing role information periodically (and/or in response to state-changing events detected at the resources 174 and 175) to the RIs 180. In some embodiments, the health checkers 155 may each also periodically submit health status queries for a set of resource group members to the appropriate set of RIs 180. The communications involved in transmitting role information and/or health state may be relatively lightweight, and as a consequence the overhead associated with propagating role information to the DNS servers 142 may not be very high. The DNS servers 142 may cache the information regarding primary roles in an in-memory database in at least some embodiments, although such cached information may periodically be saved to persistent storage as well in at least some embodiments. In addition to using the RIs 180 and the health checking subsystem of the ADS 150 for propagating role information, in at least some embodiments an alternative pathway may also be employed, in which the state managers 178 may submit new weights to be associated with resource records maintained in a persistent ADS control-plane database (not shown in FIG. 1, but illustrated in FIG. 2). In some embodiments, a reporting intermediary 180 may be implemented at the same host or computing device as a health checker 155. In at least one embodiment, a reporting intermediary may generate and transmit health status information messages directly to the DNS servers. The health status messages may be formatted in accordance with the appropriate health checking protocol being used by the DNS servers, and may include primary role information for resource groups for which the reporting intermediary receives state information from a state manager 178. In such an embodiment, the reporting intermediary 180 may subsume the logical equivalent of the functionality of the health checkers 155 described above.

Pathways for Role Information

Figure 2:
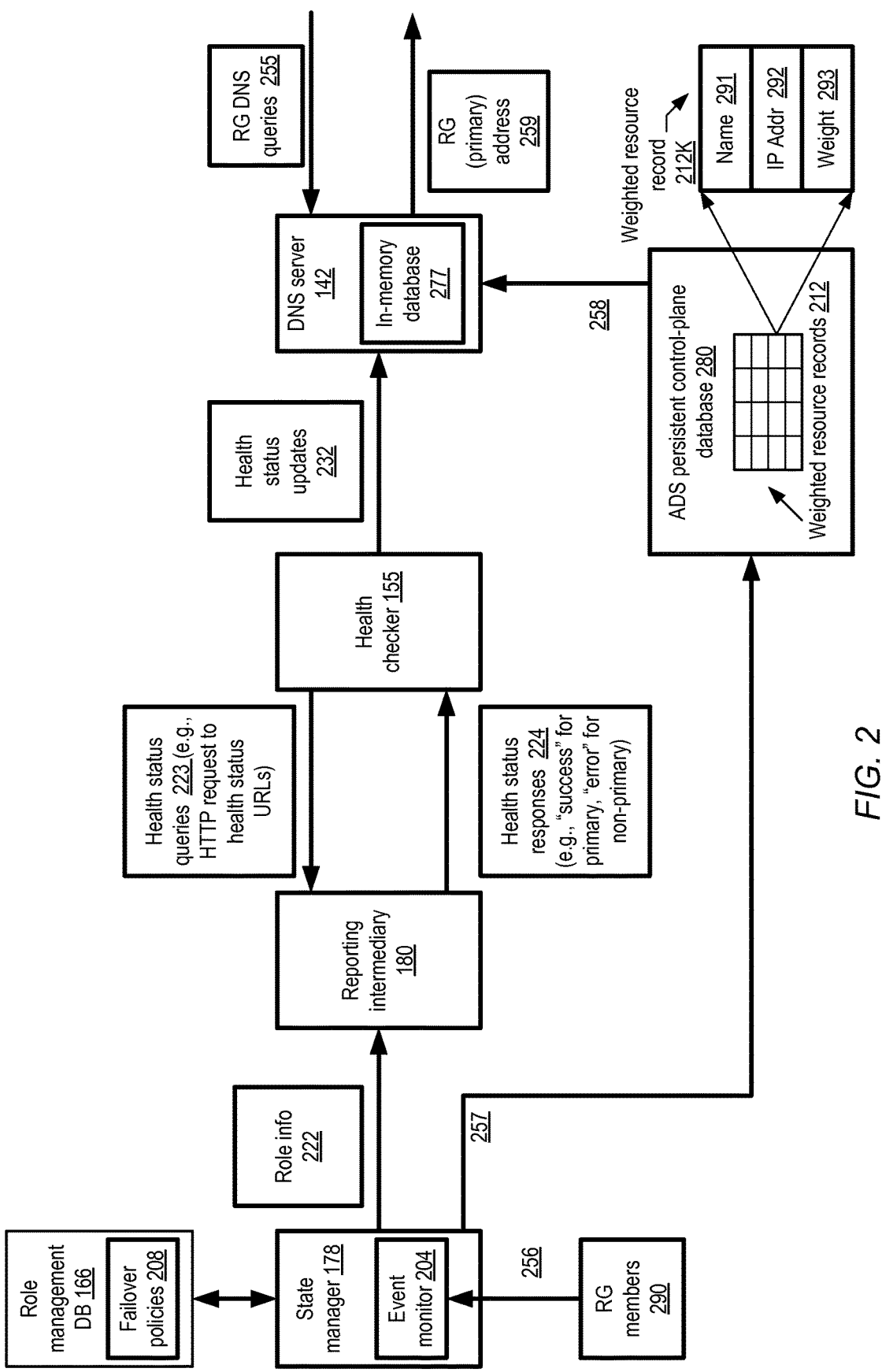
FIG. 2 illustrates examples of interactions between reporting intermediaries, state managers, and components of a network address discovery service, according to at least some embodiments.

In at least some embodiments, as mentioned above, more than one information pathway may be used to provide information regarding primary role status to a ADS associated with a network-accessible service. FIG. 2 illustrates examples of interactions between reporting intermediaries, state managers, and components of a network address discovery service, according to at least some such embodiments. As shown, one information pathway may involve a state manager 178, one or more reporting intermediaries 180, and one or more health checkers 155, while a second pathway may involve updates from the state manager 178 to a persistent control-plane database 280 of the ADS.

State manager 178 may comprise an event monitor 204 configured to watch for the occurrence of various types of state-changing events 256 with respect to resource groups members 290. In one implementation the event monitor 204 may also or instead use a heartbeat mechanism to verify that various members of the resource group are responsive to network messages. In another implementation, the event monitor 204 may also keep track of resource utilization levels at the resource group members and/or at associated network paths, and such resource utilization information may be used to determine whether a new primary is needed (e.g., if an existing primary becomes overloaded). Role assignment information may be stored in a role management database 166 in the depicted embodiment. Failover policies 208 may define the conditions under which the primary role should be revoked from the current primary and assigned to a different resource group member, and in some implementations may also indicate the algorithm or heuristics to be used to select the next primary (such as round-robin primary selection, random primary selection, least-recently-used primary selection or location-based primary selection) in cases where multiple resource group members are available for selection as primary.

In some implementations, the state manager 178 may transmit the latest role information 222 (such as the identities or network addresses of the primary and non-primary resources) for a given resource group to one or more reporting intermediaries 180 at regular intervals, e.g., once every few seconds, regardless of when or whether a role change or a failover occurs. In other implementations, role information 222 may be transmitted only when role changes occur, or may be transmitted periodically and also whenever a role change occurs. Various encodings of the role information may be transmitted in different embodiments—e.g., in some implementations, the role information 222 may be transmitted in the form of a short HTTP message that can be parsed efficiently by the reporting intermediaries 180.

According to some embodiments, the reporting intermediaries 180 may register with the health checking subsystem of the ADS as providers of health status information with respect to the resource group members. For example, each reporting intermediary 180 (which may comprise a thread or process executing at a virtual or physical compute server implemented by a network-accessible computing service of the provider network) may provide a list of URLs to which health status queries 223 in the form of HTTP requests may be directed by health checkers 155. Each such URL may represent a respective resource group member. As noted earlier, in at least some embodiments, a given reporting intermediary may receive role information and provide health status responses 224 for members of a plurality of resource groups, and each health checker may in turn be configured to submit health status queries 223 for a plurality of members of one or more resource groups. In one implementation in which health status queries comprise HTTP GET requests directed at respective URLs, the health status responses may include HTTP success codes to indicate healthy states and HTTP error codes to indicate unhealthy states. Other protocols and/or schemes for encoding and transmitting health state information may be used in various implementations.

In turn, the health checkers 155 (which may also comprise processes or threads running on virtual or physical compute servers in some implementations) may transmit health status updates 232 to DNS servers 142 and/or other servers of the network address discovery service. The health status updates may in turn be used by the DNS servers to select the network addresses to be provided in response to client-submitted DNS lookup queries 255 for resource groups—e.g., the address 259 of the primary resource (typically, for resource groups that have a single primary, the particular member resource indicated as being healthy) may be provided as the target address of the resource group. In at least some embodiments, the health information may be cached in an in-memory database 277 at one or more DNS servers 142. As mentioned earlier, in at least some embodiments the DNS servers need not be aware of the "primary" or "non-primary" status per se of any given resource; rather, the DNS servers may only be aware that for a given resource group RG, the device with address X is "healthy", and therefore address X should be supplied in response to lookup queries for RG.

In addition to using the first information pathway described above (which includes the reporting intermediaries 180), the state manager 178 may also submit role information in the form of updates to weighted DNS resource records 212 that may be stored in a persistent ADS control-plane database 280, as indicated by arrow 257. Each weighted resource record such as 212K may comprise, in none implementation, a name 291 of the resource group, an IP address 292, and a weight 293 to be used by the DNS servers when selecting network addresses among several addresses corresponding to the same name 291. In one embodiment, the weight assigned to the primary may be positive, while the weights assigned to the non-primary members may be zero or negative. Thus, when a new primary is selected, the weights of the previous primary and the new primary may both be updated in the database 280 at the request of the state manager 178 in the depicted embodiment.

In at least some embodiments, the time required to update the database 280, and for the database updates to be propagated to the relevant DNS servers 142 (as indicated by arrow 258), may in at least some cases be longer than the time taken to transmit the health information via the reporting intermediaries. Thus, the health status updates 232 may be considered the more recent indicators of primary roles in at least some such embodiments. In case of an apparent conflict between the identity of a primary resource as indicated by the health status updates 232 on the one hand and the persistent database on the other hand, the DNS servers 142 may use various heuristics to determine how to respond to lookup queries. For example, in one embodiment, in the event of a detection of a conflict, addresses 259 may be selected for some configurable period of time on the basis of the health status information and an urgent request may be sent to the database 280 to provide updated weights for the resource records of the members of the resource group. If the conflict is not resolved at the end of the configurable time period, e.g., by the database records becoming consistent with the health status information, DNS servers 142 may start responding to subsequent lookup requests with errors, or may take other corrective actions such as raising alerts. In one embodiment, the role information messages 222 sent by the state manager 178 may also be accompanied by (or include) updated weight information when a new primary is designated, for example as a confirmation of the role change.

The use of the database 280 as an alternate (albeit, in some implementations, slower) pathway for propagating primary role information to the ADS may provide an enhanced level of reliability in various embodiments. In different implementations, variations on the basic techniques illustrated in FIG. 2 may be used. For example, in some embodiments, timestamps may be included in the role information 222, the health status responses 224, the health status updates 232, and/or in the weighted resource records 212 indicating the time of the latest communication from the state manager 178, and such timestamps may be used to resolve conflicts between the database entries and the health status updates. In other embodiments, the transfer of role information to the RIs may also or instead be initiated by the RIs rather than state managers. In one embodiment, the transfer of health status information from the RIs to the health checkers may also or instead be initiated by the RIs rather than by the health checkers.

Interpreting Health Status Information and Weights

As indicated above, in at least some embodiments, resource group member health information supplied by reporting intermediaries 180 may be used together with weighted resource record sets to determine the target address to be supplied for a resource group by ADS servers. Furthermore, multiple reporting intermediaries 180 and health checkers 155 may be involved in the transmission of health status to the ADS servers. In a distributed environment, it may sometimes be the case that the health status information reaching the ADS DNS servers 142 from different sources may conflict (e.g., because of failures/errors along the information pathway, or because some elements of the information pathway may have out-of-date information). FIG. 3a-FIG. 3d illustrate examples of the use of health status information and resource record weights by a network address discovery service in response to address lookup queries, according to at least some embodiments.

Health status updates pertaining to two resource group members are provided by each of two health checkers 155A and 155B to a DNS server 142 of the ADS in the examples of FIG. 3a-FIG. 3d. The IP addresses of the two resource group members are shown as "1.1.1.1" and "2.2.2.2" respectively by way of example. The most recent weight values assigned to the two resources (as known at the DNS server 142) are "1.0" (assigned to member 1.1.1.1) and "0.0" (assigned to member 2.2.2.2). The "1.0" weight indicates primary status, while the "0.0" weight indicates non-primary status. In each of the four examples of FIG. 3a-3d, a different combination of health status information is received by the DNS server. The interpretation of that health status information to determine the address to be provided in a response to a lookup query, in conjunction with the weights assigned to the two resource group members (especially in cases of conflicting information being provided by health checkers, or when a primary cannot be unequivocally determined based on the received information alone) may be governed by different logic in different embodiments.

As noted earlier, in some embodiments the health checkers 155A and 155B may each use the HTTP status codes returned in response to HTTP GET requests directed at the reporting intermediaries to arrive at the conclusions regarding the health states of the two resource group members. In the event that a given health checker 155 itself receives conflicting health status responses from different reporting intermediaries regarding a given resource group member, any of various approaches may be used by the health checker to arrive at its own conclusion in different implementations. For example a "majority vote" approach in which the status that is indicated by the majority of the reporting intermediaries is deemed the correct status may be used, or a "default-healthy" approach may be used in which if even one healthy state indicator is received for a resource, that resource may be deemed healthy by the health checker 155.

Figure 3A:
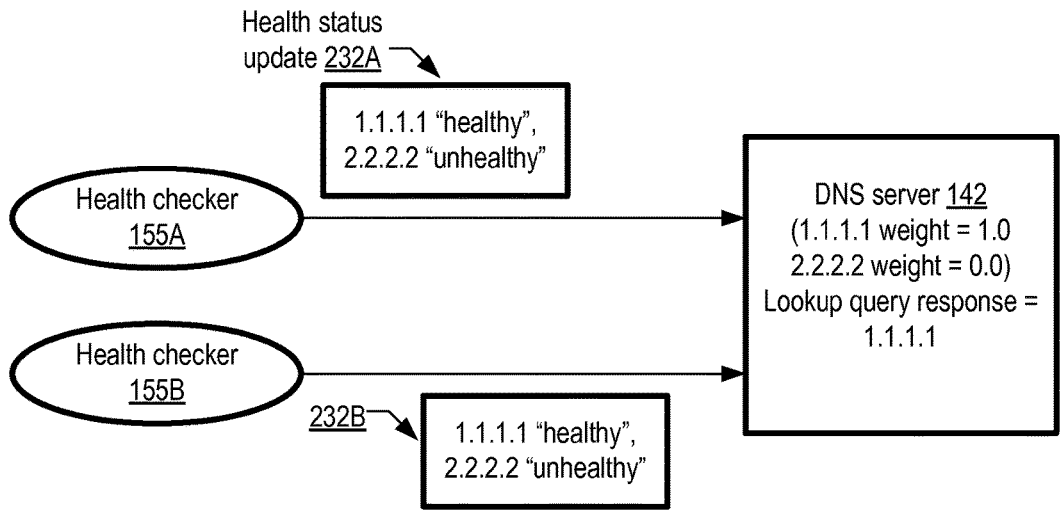
FIG. 3a-FIG. 3d illustrate examples of the use of health status information and weighted resource records by a network address discovery service in response to address lookup queries, according to at least some embodiments.

In FIG. 3a, the health status updates 232A and 232B from health checkers 155A and 155B both indicate that 1.1.1.1 is healthy (which may represent the current primary role of 1.1.1.1), while 2.2.2.2 is unhealthy (which may represent the current non-primary role of 2.2.2.2). In addition, the weight (1.0) assigned to 1.1.1.1 also serves as an indicator that 1.1.1.1 is the primary. Accordingly, in response to an address lookup query for the resource group comprising resources with addresses 1.1.1.1 and 2.2.2.2, the address 1.1.1.1 may be returned by the DNS server as the target address.

Figure 3B:
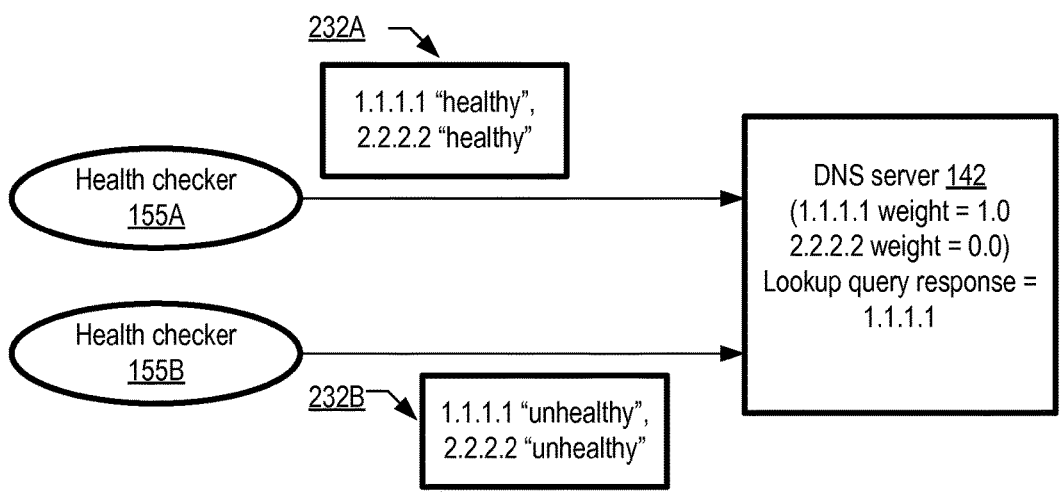

In the scenario illustrated in FIG. 3b, the two health checkers provide conflicting information. As shown, health checker 155A indicates that 1.1.1.1 and 2.2.2.2 are both healthy, while health checker 155B indicates that 1.1.1.1 and 2.2.2.2 are both unhealthy. The conflicts may arise due to various reasons such as loss of connectivity along the information pathway shown in FIG. 2, errors, failures or unexpected delays at some of the components involved, for example. In the depicted embodiment, the DNS server may attempt to find, for the resource with weight 1.0, whether at least one report of a healthy status is received, and if so, to select that resource's address as the target address to be supplied in response to a lookup query. Since health status update 232A indicates that 1.1.1.1 is healthy, and 1.1.1.1's weight is 1.0, the target address 1.1.1.1 is provided as the target address in response to lookup queries.

Figure 3C:
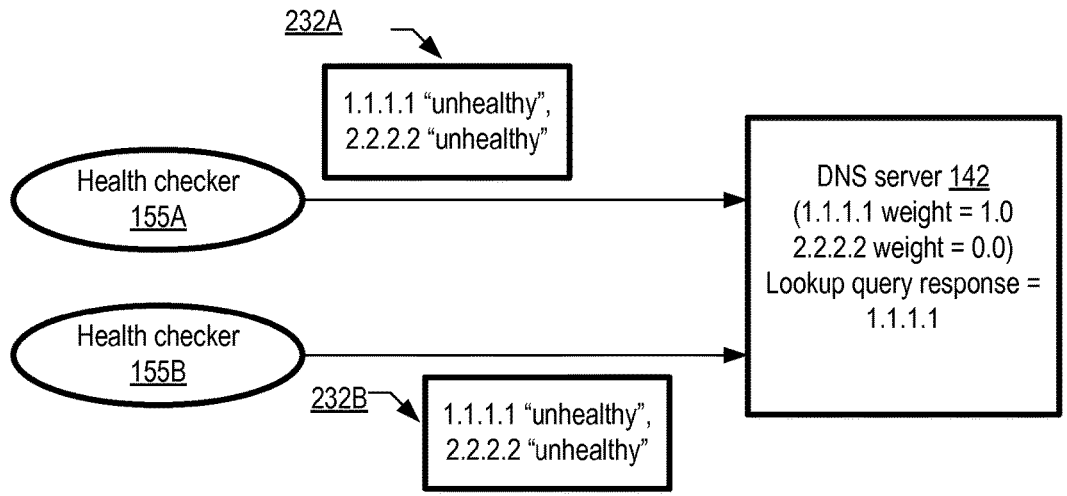

In the scenario illustrated in FIG. 3c, both health checkers indicate that both resources 1.1.1.1 and 2.2.2.2 are unhealthy. In such a scenario, in the depicted embodiment the DNS server may simply revert to using the weights alone, and hence may also provide 1.1.1.1 as the target address in response to a lookup query.

Figure 3D:
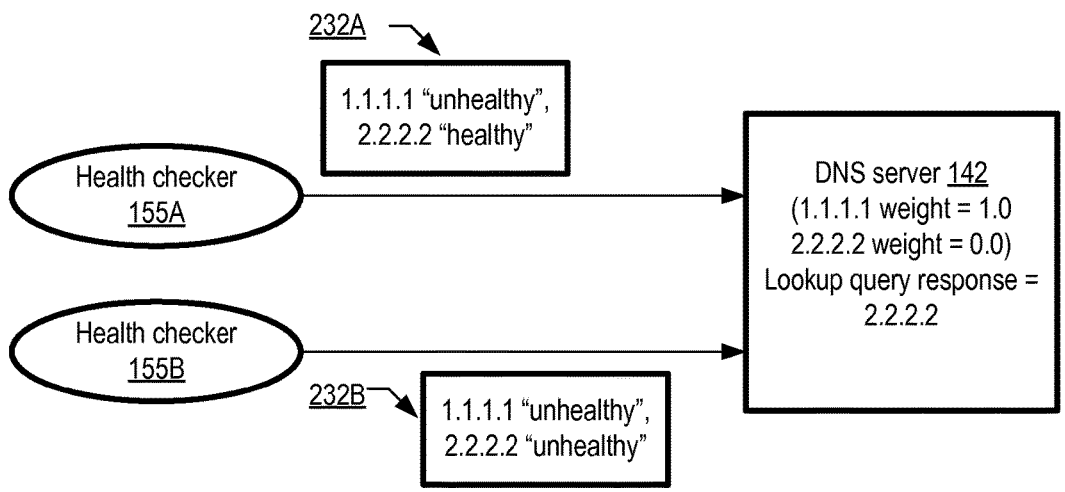

In the scenario shown in FIG. 3d, both health checkers report that 1.1.1.1 is unhealthy, health checker 155A indicates that 2.2.2.2 is healthy, and health checker 155B indicates that 2.2.2.2 is unhealthy. In this case, the DNS server 142 is unable to find any report of the expected target (the resource with weight 1.0, i.e., 1.1.1.1) being healthy, while there is at least one report that a different resource (2.2.2.2) is healthy. Accordingly, the DNS server may choose to respond to an address lookup query by providing 2.2.2.2 as the target address for the resource group, despite the fact that the weight assigned to 2.2.2.2 is not "1.0". Thus, in the example of FIG. 3d, the health status information overrides the weight information available at the DNS server.

It is noted that the logic used for target address determination at the DNS server 142 may differ from that illustrated in FIG. 3a-FIG. 3d in different embodiments. For example, in some embodiments, the DNS server may respond with a DNS error or the equivalent of an "address not found" message in a scenario similar to that shown in FIG. 3c, instead of reverting to using the weight values as the determining factor when all the health checkers indicate an unhealthy status for all the members of the resource group.

Placement of Reporting Intermediaries and Health Checkers for High Availability

As noted earlier, large provider networks may sometimes comprise a plurality of availability containers, each of which may in turn comprise a portion or all of one or more data centers. Different availability containers may be designed and engineered in such a way that failures occurring within one availability container may typically be prevented from spreading to, or affecting operations at, any other availability container. FIG. 4 illustrates an example of the use of the placement of reporting intermediaries in a provider network comprising a plurality of availability containers 410 (e.g., availability containers 410A, 410B and 410C), according to at least some embodiments. In the depicted embodiment, the provider network is organized into geographic regions on the basis of data center locations, and in the depicted example, all three availability containers 410A, 410B and 410C are located within the same provider network region 402.

A primary resource 174A of a resource group is shown within availability container 410A. Based on the availability requirements of the network-accessible service being implemented using the resource group, and/or on the preferences of the client on whose behalf the resource group is instantiated, a non-primary resource 175A is located within a different availability container 410C. A state manager component 178 responsible for monitoring events at the resources 174A and 175A is shown located within a third availability container 410B, although in at least some embodiments the state manager's functionality may also or instead be replicated in any or all of the availability containers of the region 402. Three reporting intermediaries are configured for the resource group: RI 180A in availability container 410A, RI 180B in availability container 410B and RI 180C in availability container 410C. The state manager 178 may be configured to push role information for the resource group to each of the three RIs 180A, 180B and 180C during normal operating conditions.

Two health checkers (HCs) 155A and 155B, located respectively within availability containers 410A and 410C, are configured to send health status queries regarding the resources 174A and 175A to each of the three RIs 180A, 180B and 180C in the illustrated example configuration. In turn, each of the health checkers 155A and 155B may pass on health status information regarding the resources 174A and 175A to a plurality of DNS servers such as 142A, 142B and 142C of the ADS in the depicted example. It is noted that although the DNS servers 142 in the illustrated example configuration are shown outside the provider network region 402 in at least some embodiments at least some of the DNS servers may themselves be located within the provider network.

The number of RIs 180 and health checkers 155 configured for a given resource group, as well as their placement within different availability containers 410, may be determined based on various availability goals in different embodiments. In the example shown in FIG. 4, the placement has been chosen such that at least one pathway for providing primary role information to the DNS servers remains available even if one of the availability containers in which a resource group member resides becomes inaccessible. Even if network access to all the devices of availability container 410A is lost (as indicated by the "X" symbols at the HC 155A, the RI 180A and the resource 174A), e.g., due to a widespread power failure event or a natural disaster, in the depicted architecture several role information pathways 450 may remain available. For example, in the event of an outage affecting the availability container 410A, state manager 178 may still be able to communicate with resource 175A (e.g., to inform that resource that it has been designated as primary) as well as RIs 180B and 180C, and RIs 180B and 180C may still be able to communicate with HC 155B to convey the update health status information regarding resources 174A and 175A.

In various embodiments, as mentioned earlier, the functionality of the state manager 178 may be instantiated within any or all of the availability containers. Thus, if availability container 410B becomes inaccessible, a state manager component 178 may be instantiated in availability container 410A or 410C to take over the responsibilities of the state manager component in the availability container 410B. It is noted that the number of availability containers 410 in a provider network region 402, the number of non-primary resources in a resource group, the number of RIs 180 configured for a given resource group, and/or the number of health checkers configured for a given resource group, as well as the distribution of these various components across different availability containers, may differ from that shown in the example configuration of FIG. 4. In some embodiments, a resource group may comprise members distributed across multiple regions 402, for example, and health checkers and RIs may accordingly be configured for such a resource group in the availability containers of different regions.

Methods for Primary Status Reporting

Figure 5:
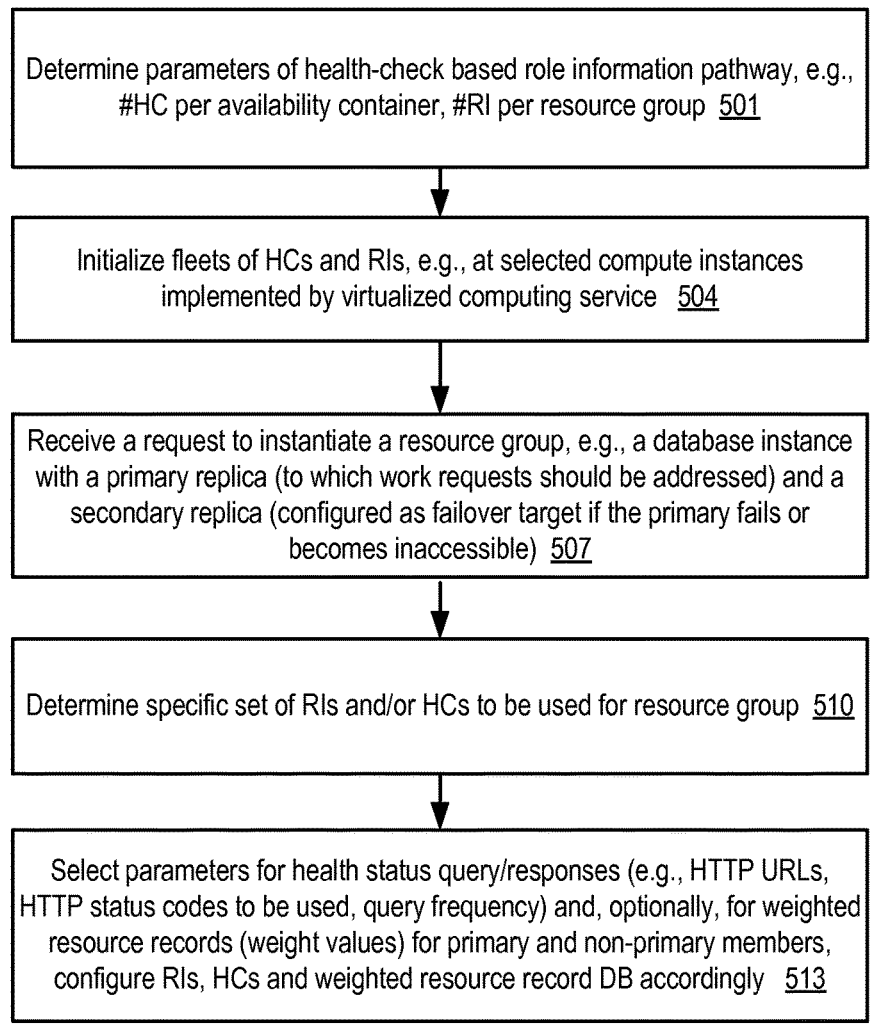
FIG. 5 is a flow diagram illustrating aspects of operations that may be performed to configure a reporting service for a resource group, according to at least some embodiments.

FIG. 5 is a flow diagram illustrating aspects of operations that may be performed to configure a reporting service for a resource group, according to at least some embodiments. As shown in element 501, values may be determined for parameters such as the number of reporter instances (#RI) per resource group and/or the number of health checkers (#HC) to be configured per availability container or per resource group. In at least some embodiments, default values used for such parameters (e.g., values defined in configuration settings used for the reporting service and/or the ADS) may be dynamically modified as needed, e.g., in response to changing workload levels at the RIs and/or the HCs or in response to requests from clients.

In some embodiments, respective pools or fleets of RIs 180 and/or HCs 155 may be instantiated (element 504). In one embodiment in which the provider network implements a virtualized computing service, for example, some number of RI processes and/or HC processes may be started up at a selected set of virtualized compute servers or compute instances. The RIs and/or the HCs may be instantiated in standby mode in some embodiments, e.g., before they are actually assigned to specific resource groups. In other embodiments, RIs and/or HCs may only be instantiated when needed, e.g., when a new resource group is established on behalf of a client.

A request to instantiate a resource group may be received (element 507). For example, a client of a database service may request that a pair of database instance replicas be established, in which one replica is designated initially as the primary configured to respond to work requests such as reads and writes, while the other replica is designated as the failover target that is to be made primary in the event of a failure or loss of connectivity to the primary.

The specific set of RIs and/or HCs to be used for the new resource group may be selected, for example from the pre-created fleet (element 510). If pre-initialized RIs or HCs are not available or are determined to be overloaded, new ones may be instantiated. The parameters of the health status queries and responses, such as the specific URLs and HTTP response codes to be used to indicate healthy versus unhealthy status and the frequency with which health status queries are to be generated, may be selected in the depicted embodiment (element 513). In embodiments in which weighted DNS resource records are also used, the weights to be assigned to the various resources may also be determined and corresponding updates may be transmitted to a persistent control-plane database of the ADS. In embodiments in which HTTP GETs and response codes are used as the health queries and responses, the RIs may be configured to respond to HTTP requests for the selected URLs, and the HCs may be configured to submit queries to the selected URLs. In some embodiments, one or more programmatic interfaces (such as APIs) may be exposed by the health checking subsystem to enable registration of the health checking URLs and/or desired query frequencies. In at least one embodiment, error-handling policies for the HCs and/or the RIs may also be specified during the configuration process, e.g., indicating how the HCs are to respond if they do not receive responses to health status queries from a given RI within a specified interval, or how an RI is to respond if it does not receive a health status query or a role information update within a specified interval.

Figure 6:
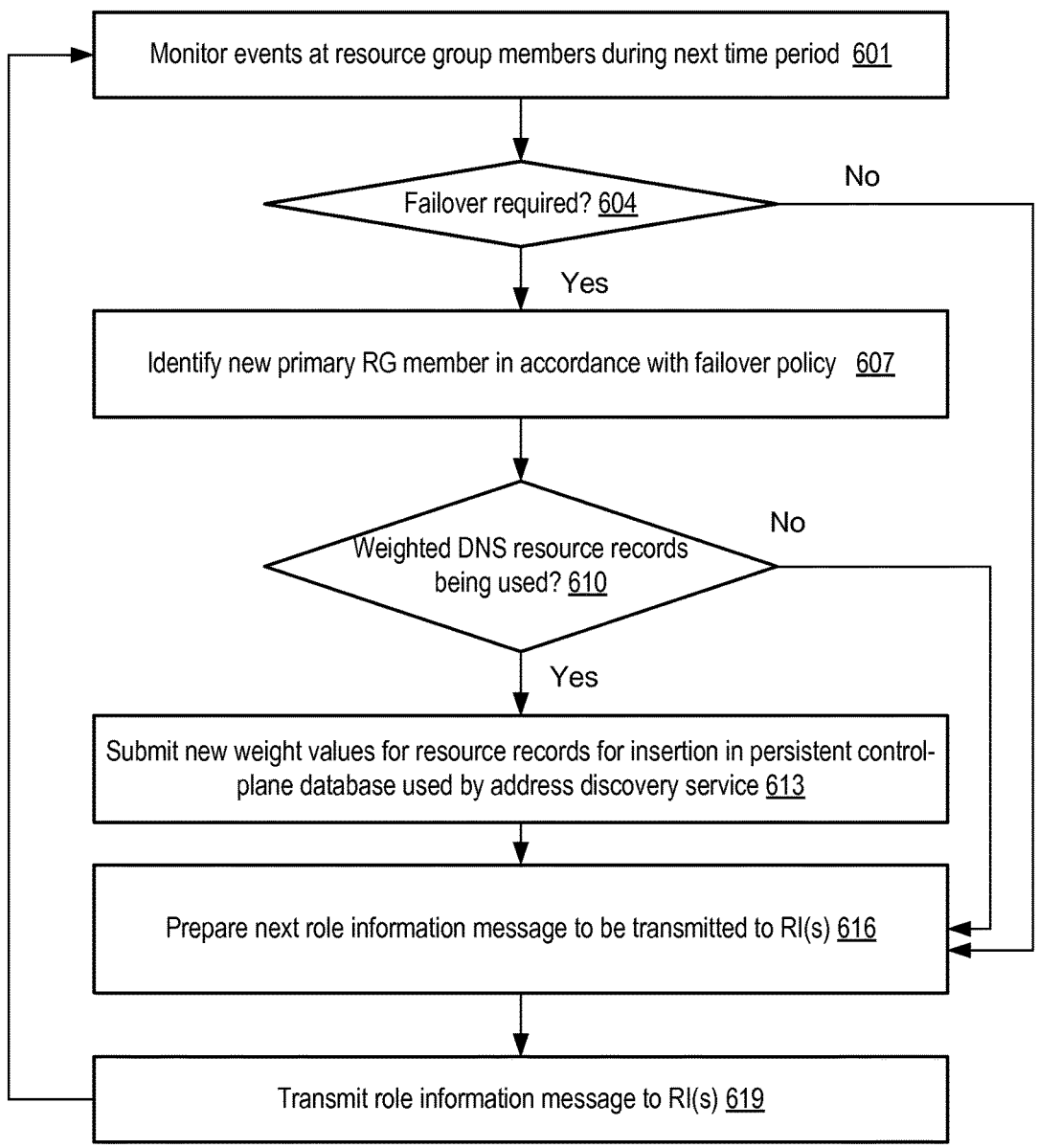
FIG. 6 is a flow diagram illustrating aspects of operations that may be performed at a state manager configured to provide resource role information to a reporting service, according to at least some embodiments.

FIG. 6 is a flow diagram illustrating aspects of operations that may be performed at a state manager 178 configured to provide resource role information to a reporting service, according to at least some embodiments. In the depicted embodiment, role information indicating the identity of the current primary may be transmitted from the state manager to reporting intermediaries at some selected time intervals, regardless of whether the resource designated as the primary remains the primary or not. As shown in element 601, the state manager may monitor various types of events at a plurality of resource group members over a time period. The events may include, for example, hardware and/or software failures, errors of various types that may be reported in system or application logs, and so on. In some implementations a heartbeat mechanism may also or instead be employed, in which a network message may be sent to each resource group member and the responsiveness of the resource to the heartbeat message (e.g., whether a corresponding heartbeat response is received within a target time window) may be interpreted as an indication of the health status of the member. In accordance with failover policies in effect for the network-accessible service being implemented at the resource group, some types of events detected at the resources may lead to a failover or a change in the assignment of the primary role. If a failover is to be implemented (as determined in element 604 of FIG. 6), a new primary resource may be identified (element 607). In some implementations, in which multiple non-primary resource may be present in the resource group, an approach such as random selection or round-robin selection may be used to identify the specific non-primary that is chosen as the new primary.

If weighted DNS resource record sets are being used for the resource group (as determined in element 610), new weight values may be determined for each of the affected resource records and submitted for insertion into a control-plane database being used by the network address discovery service (element 613), e.g., for the original primary's resource record as well as the new primary's resource record. For example, if a weight assignment approach similar to that illustrated in FIG. 3*a*-FIG. 3*d* is being used, the old primary's weight may be set to 0.0 and the new primary's weight may be set to 1.0. A role information message 222 indicating the identity of the new primary may be prepared (element 616) for transmission, and sent to the appropriate set of reporting intermediaries configured for the resource group (element 619). In the depicted embodiment, as mentioned above, a role information message may be sent regardless of whether a failover was initiated, as indicated by the arrow between the negative outcome of element 604 and element 616. In other embodiments, the role information message may only be generated and sent in the event of a primary change. The state manager may then resume monitoring events for the next monitoring time period, and the operations corresponding to elements 601 onwards may be repeated for the next time period.

Figure 7:
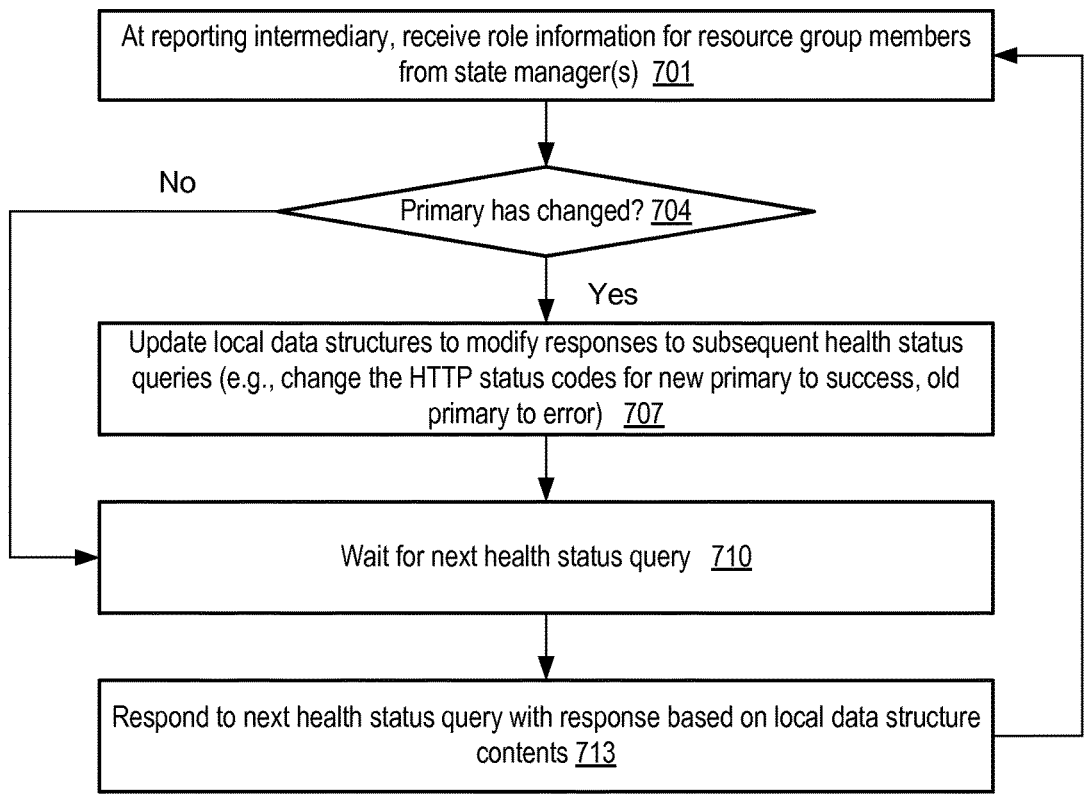
FIG. 7 is a flow diagram illustrating aspects of operations that may be performed at a reporting intermediary, according to at least some embodiments.

FIG. 7 is a flow diagram illustrating aspects of operations that may be performed at a reporting intermediary, according to at least some embodiments. The reporting intermediaries may maintain respective local data structures to store the role information received from the state managers in the depicted embodiment. As shown in element 701, the reporting intermediary may receive a set of role information regarding various resource group members from the state manager. If a comparison of the received role information with the previously-stored role information indicates that the primary has changed (as detected in element 704), the local data structures may be updated accordingly (element 707) to reflect the new primary information. For example, in some implementations in which HTTP status codes are used as indications of primary or non-primary status, the HTTP status codes to be used for the respective URLs of the old primary and the new primary may be adjusted accordingly.

The reporting intermediary may then wait for the next health status query from a health checker (element 710). When such a query is received the response to it may be generated based on the contents of the reporting intermediary's local data structure (element 713). If the primary had not changed (as also determined in operations corresponding to element 704), the local data structure would already have the correct primary information, and this information may be used to respond to the next health status query. Operations corresponding to elements 701 onwards may be repeated for the next iteration of role information transfer and health status information transfer.

In the embodiment illustrated in FIG. 7, the state manager pushes the role information to the reporting intermediary (i.e., the role information is transferred to the reporting intermediary at the initiative of the state manager). Furthermore, health information is requested or pulled by the health checker in the embodiment shown in FIG. 7—that is, the reporting intermediary is responsible for responding to health status queries, and does not push the health status information to the health checkers. In other embodiments, the role of the reporting intermediary may be more active than that shown in FIG. 7, with respect to interactions with state managers, health checkers, or with respect to both state managers and health checkers. In some such embodiments, the reporting intermediaries may query the state managers for role information, instead of or in addition to receiving role information transmitted at the initiative of the state managers. Similarly, in some embodiments, the reporting intermediaries may push health status information to health checkers instead of or in addition to responding to health status queries from the health checkers.

It is noted that in various embodiments, operations other than those illustrated in the flow diagrams of FIGS. 5, 6, and 7 may be used to implement the reporting service functionality, and that some of the operations shown may not be implemented, or may be implemented in a different order, or in parallel rather than sequentially. For example, it may be the case that in some embodiments the health checkers may query the reporting intermediaries more frequently than the state managers provide role information to the reporting intermediaries, in which case the sequencing of the operations performed at the reporting intermediaries may differ from that shown in FIG. 7

Use Cases

The techniques described above, of using lightweight reporting intermediaries together with a health checking subsystem to efficiently propagate information regarding primary resources of resource groups may be useful in a number of scenarios. For example, large database applications set up on behalf of clients of a network-accessible database service may be accessed by end users from network locations distributed across many different countries or even different continents. The end users may rely on various different DNS servers spread around the Internet and within the provider network for address discovery. In such scenarios, delays in propagating primary role changes may potentially result in substantial numbers of transactions being aborted or delayed, which could have significant business impact.

Furthermore, the ability to distribute the reporting intermediaries (as well as health checkers) across multiple data centers or availability containers may help ensure that the correct addresses for work requests are provide to end users even in the presence of large-scale failures or network partitions. The flexible configuration of the reporting service, as well as the use of multiple pathways for propagating primary role information, may help achieve the high levels of availability desired for mission-critical client applications.

Illustrative Computer System

Figure 8:
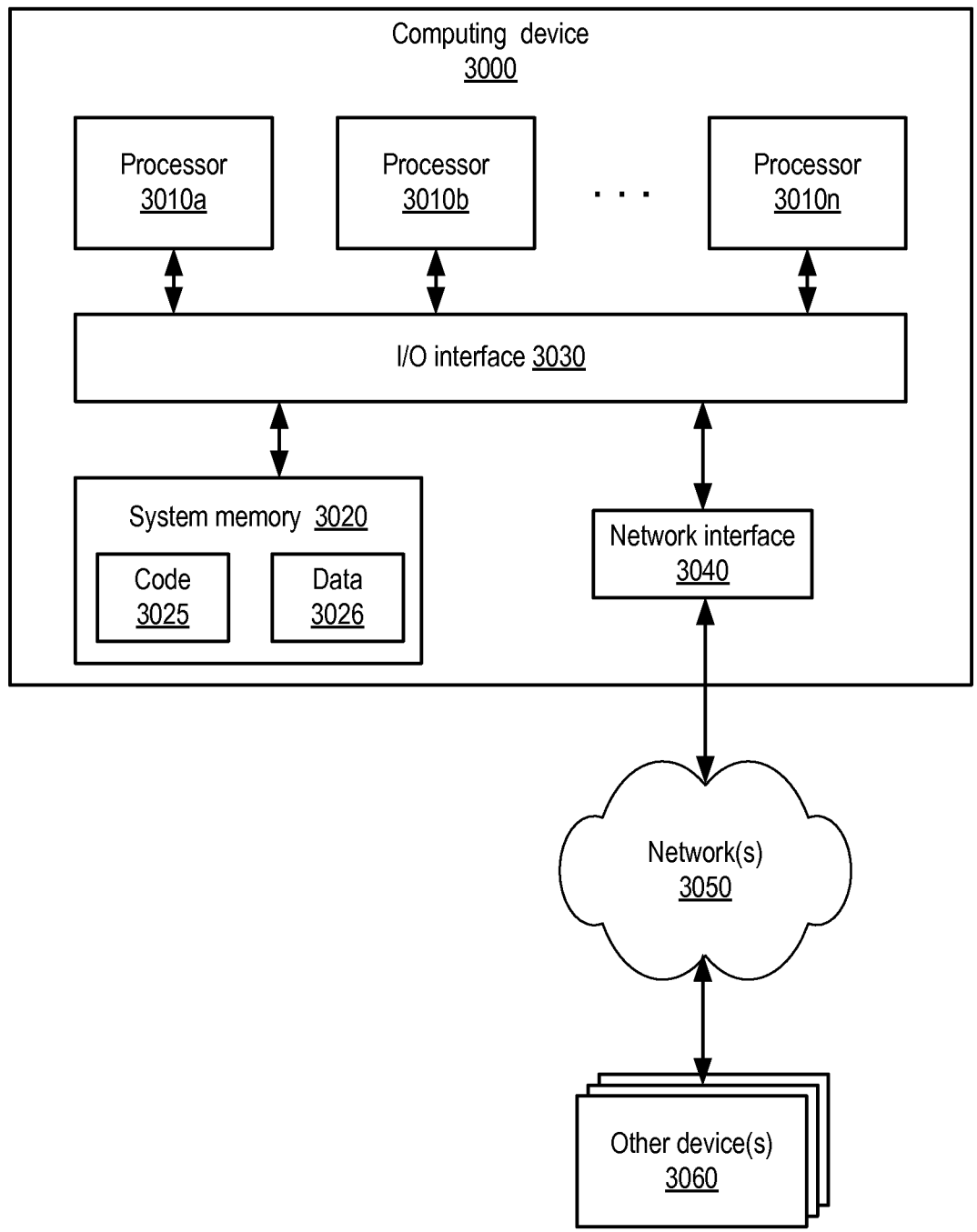
FIG. 8 is a block diagram illustrating an example computing device that may be used in at least some embodiments.

In at least some embodiments, a server that implements a portion or all of one or more of the technologies described herein, including the techniques to implement reporting intermediaries, resource group members, health checkers, state managers, and/or network address discovery servers may include a general-purpose computer system that includes or is configured to access one or more computer-accessible media. FIG. 8 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 7, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices including one or more respective hardware processors and configured to:
assign one or more reporting intermediaries to a resource group of a network-accessible service, wherein the one or more reporting intermediaries are configured to respond to health status queries pertaining to the resource group;
receive, at a particular reporting intermediary of the one or more reporting intermediaries, from a state management component of the network-accessible service, role information pertaining to one or more members of the resource group, wherein the role information comprises an indication of a primary role granted to a particular member of the resource group, wherein the primary role indicates that the particular member is to handle a category of work requests directed to the resource group, wherein each other member of the resource group is granted a non-primary role that indicates that the other member is to refrain from handling the category of work requests directed to the resource group;
receive a health status query pertaining to the resource group at the particular reporting intermediary from a health checking subsystem used by a network address discovery service;

transmit a health status response to the health checking subsystem, wherein the health status response includes an identification of the particular member of the resource group granted the primary role, the identification derived at least in part from the role information; and select, based at least in part on the identification of the particular member of the resource group in the health status response, at the network address discovery service, a network address of the particular member as a target address to be provided in response to a lookup query requesting a network address of the resource group, wherein the identification is based at least in part on an indication of health of the particular member of the resource group in the health status response.

2. The system as recited in claim 1, wherein the resource group comprises at least a second member, and wherein the one or more computing devices are further configured to:

based on a detection of one or more failures, revoke the primary role from the particular member and grant the primary role to the second member in accordance with a failover protocol;

receive, at the particular reporting intermediary, an indication that the second member has been granted the primary role;

in response to a subsequent health status query, transmit an additional health status response to the health checking subsystem comprising an indication that the second member has been granted the primary role; and select, based at least in part on the additional health status response, a network address of the second member as a target address to be provided in response to a subsequent lookup query requesting a network address of the resource group.

3. The system as recited in claim 1, wherein the one or more computing devices are further configured to:

request a creation of a plurality of resource records corresponding to the resource group for use by the network address discovery service, wherein each resource record of the plurality of resource records comprises (a) a name assigned to the resource group, (b) a network address of a member of the resource group and (c) a weight to be assigned to the resource record in response to a lookup query for an address associated with the name, and wherein, to select the network address of the particular member, a network address discovery server examines the respective weights assigned to one or more resource records of the plurality of resource records.

4. The system as recited in claim 1, wherein the one or more computing devices are further configured to:

submit a first health status registration request to the health checking subsystem, indicating a particular HTTP (HyperText Transfer Protocol) URL (uniform record locator) associated with health status information of the particular member, and a second health status registration request to the health checking subsystem, indicating a different HTTP URL associated with health status information of a different member of the resource group;

receive, at the particular reporting intermediary from the health checking subsystem, a plurality of health status queries pertaining to the resource group, wherein each health status query of the plurality of health status queries comprises a respective HTTP request directed to one of: the particular HTTP URL and the different HTTP URL;

wherein the health status response derived at least in part from the role information comprises an HTTP success code.

5. The system as recited in claim 1, wherein the network-accessible service comprises a database service implemented at a provider network, and wherein the resource group comprises a plurality of replicas of a database instance implemented at the database service on behalf of a client.

6. A method, comprising:

performing, by one or more computing devices:

receiving, at a particular reporting intermediary of one or more reporting intermediaries assigned to a resource group of a network-accessible service, from a state management component of the network-accessible service, role information pertaining to one or more members of the resource group, wherein the role information comprises an indication of a primary role granted to a particular member of the resource group, wherein the primary role indicates that the particular member is to handle a category of work requests directed to the resource group, wherein each other member of the resource group is granted a non-primary role that indicates that the other member is to refrain from handling the category of work requests directed to the resource group;

receiving a health status query pertaining to the resource group at the particular reporting intermediary from a health checking subsystem used by a network address discovery service;

transmitting a health status response to the health checking subsystem, wherein the health status response includes an identification of the particular member of the resource group granted the primary role, the identification derived at least in part from the role information; and selecting, at the network address discovery service and based at least in part on the identification of the particular member of the resource group in the health status response, a network address of the particular member to be included in a response to a lookup query requesting a network address of the resource group, wherein the identification is based at least in part on an indication of health of the particular member of the resource group in the health status response.

7. The method as recited in claim 6, wherein the resource group comprises at least a second member, further comprising performing, by the one or more computing devices:

based on a detection of one or more failures, revoking the primary role from the particular member and granting the primary role to the second member in accordance with a failover protocol;

receiving, at the particular reporting intermediary, an indication that the second member has been granted the primary role;

in response to a subsequent health status query, transmitting an additional health status response to the health checking subsystem comprising an indication that the second member has been granted the primary role; and selecting, based at least in part on the additional health status response, a network address of the second member as a target address to be provided in response to a subsequent lookup query requesting a network address of the resource group.

8. The method as recited in claim 7, wherein the particular member and the second member are located respectively in a first and a second availability container of a provider network, wherein the first availability container has a first failure profile and the second availability container has a different failure profile.

9. The method as recited in claim 6, further comprising performing, by the one or more computing devices:
requesting a creation of a plurality of resource records corresponding to the resource group, for use by the network address discovery service, wherein each resource record of the plurality of resource records comprises (a) a name assigned to the resource group, (b) a network address of a member of the resource group and (c) a weight to be assigned to the resource record in response to a lookup query for an address associated with the name, and wherein, to select the network address of the particular member, the network address discovery service examines the respective weights assigned to one or more resource records of the plurality of resource records.

10. The method as recited in claim 6, further comprising performing, by the one or more computing devices:
submitting a first health status registration request to the health checking subsystem, indicating a particular HTTP URL associated with health status information of the particular member, and a second health status registration request to the health checking subsystem, indicating a different HTTP URL associated with health status information of a different member of the resource group;
receiving, at the particular reporting intermediary from the health checking subsystem, a plurality of health status queries pertaining to the resource group, wherein each health status query of the plurality of health status queries comprises a respective HTTP request directed to one of: the particular HTTP URL or the different HTTP URL;
wherein the health status response derived at least in part from the role information comprises an HTTP success code.

11. The method as recited in claim 10, further comprising performing, by the one or more computing devices:
generating a different health status response in response to a different health status query directed to the different HTTP URL, wherein the different health response comprises an HTTP error code in accordance with a determination that the different member of the resource group is not granted a primary role for handling a category of work requests.

12. The method as recited in claim 6, wherein the network-accessible service comprises a database service implemented at a provider network, and wherein the resource group comprises a plurality of replicas of a database instance implemented at the database service on behalf of a client.

13. The method as recited in claim 6, further comprising performing, by the one or more computing devices:
determining a number of reporting intermediaries to be assigned to the resource group, based at least in part on an availability requirement.

14. The method as recited in claim 6, further comprising performing, by the one or more computing devices:
configuring the particular reporting intermediary to receive role information pertaining to a plurality of resource groups, and to respond to health status queries pertaining to the plurality of resource groups.

15. The method as recited in claim 6, wherein the network-accessible service is implemented at a provider network, further comprising performing, by the one or more computing devices:
instantiating the particular reporting intermediary at a compute instance implemented by a virtualized computing service of the provider network.

16. A non-transitory computer-accessible storage medium storing program instructions that when executed on one or more processors:
receive, at a particular reporting intermediary of one or more reporting intermediaries assigned to a resource group of a network-accessible service, from a state management component of the network-accessible service, role information pertaining to one or more members of the resource group, wherein the role information comprises an indication of a primary role granted to a particular member of the resource group, wherein the primary role indicates that the particular member is to handle a category of work requests directed to the resource group, wherein each other member of the resource group is granted a non-primary role that indicates that the other member is to refrain from handling the category of work requests directed to the resource group;
receive a health status query pertaining to the resource group at the particular reporting intermediary from a health checking subsystem configured for a network address discovery service; and
transmit a health status response to the health checking subsystem, derived at least in part from the role information and including an identifier of the particular member of the resource group granted the primary role, wherein the identifier of the particular member in the health status response is utilized by the network address discovery service to select a network address of the particular member to be included in a response to a lookup query requesting a network address of the resource group, wherein the identifier is based at least in part on an indication of health of the particular member of the resource group in the health status response.

17. The non-transitory computer-accessible storage medium as recited in claim 16, wherein the resource group comprises at least a second member, wherein the instructions when executed on the one or more processors:
receive, at the particular reporting intermediary, an indication that the second member has been granted the primary role in accordance with a failover protocol of the network-accessible service;
in response to a subsequent health status query, transmit an additional health status response to the health checking subsystem comprising an indication that the second member has been granted the primary role, wherein in accordance with the additional health status response, a network address of the second member is provided as a target address in response to a subsequent lookup query requesting a network address of the resource group.

18. The non-transitory computer-accessible storage medium as recited in claim 16, wherein the network address discovery service comprises a service compatible with the Domain Name System (DNS), and wherein the lookup query comprises a DNS lookup query.

19. The non-transitory computer-accessible storage medium as recited in claim 16, wherein the instructions when executed on the one or more processors:
- receive, at the particular reporting intermediary from the health checking subsystem, a plurality of health status queries pertaining to the resource group, wherein each health status query of the plurality of health status queries comprises a respective HTTP request directed to one of: a particular HTTP URL registered at the health check subsystem for obtaining health status information of the particular member, or a different HTTP URL registered at the health check subsystem for obtaining health status information of a different member of the resource group;
- wherein the health status response derived at least in part from the role information comprises an HTTP success code.

20. The non-transitory computer-accessible storage medium as recited in claim 19, wherein the instructions when executed on the one or more processors:
- generate a different health status response in response to a different health status query directed to the different HTTP URL, wherein the different health response comprises an HTTP error code in accordance with a determination that the different member of the resource group is not granted a primary role for handling a category of work requests.

21. A method, comprising:
performing, by one or more computing devices:
- receiving, at a particular reporting intermediary of one or more reporting intermediaries assigned to a resource group of a network-accessible service, from a state management component of the network-accessible service, role information pertaining to one or more members of the resource group, wherein the role information comprises an indication of a primary role granted to a particular member of the resource group, wherein the primary role indicates that the particular member is to handle a category of work requests directed to the resource group, wherein each other member of the resource group is granted a non-primary role that indicates that the other member is to refrain from handling the category of work requests directed to the resource group;
- generating, at the particular reporting intermediary, a health status message pertaining to the resource group, the health status message including an identifier of the particular member granted the primary role, the identifier based at least in part on the role information, wherein the health status message is formatted in accordance with a health checking protocol in use by a network address discovery service; and
- transmitting the health status message from the particular reporting intermediary to the network address discovery service, wherein the network address discovery service is configured to select, based at least in part on the identifier of the particular member granted the primary role that is included in the health status message, a network address of the particular member in response to a lookup query requesting a network address of the resource group, wherein the identifier is based at least in part on an indication of health of the particular member of the resource group in the health status message.

* * * * *